Jan. 29, 1952 | F. GRAY ET AL | 2,583,562

CATHODE-RAY DEVICE

Filed Nov. 13, 1947 | 2 SHEETS—SHEET 1

INVENTORS: F. GRAY
R. W. SEARS

BY [signature]

ATTORNEY

Jan. 29, 1952 F. GRAY ET AL 2,583,562

CATHODE-RAY DEVICE

Filed Nov. 13, 1947 2 SHEETS—SHEET 2

INVENTORS: F. GRAY
R. W. SEARS
BY [signature]
ATTORNEY

Patented Jan. 29, 1952

2,583,562

UNITED STATES PATENT OFFICE 2,583,562

CATHODE-RAY DEVICE

Frank Gray, East Orange, and Raymond W. Sears, West Orange, N. J., assignors to Bell Telephone Laboratories, Incorporated, New York, N. Y., a corporation of New York Application November 13, 1947, Serial No. 785,696

3 Claims. (Cl. 250—27)

Figure 1:
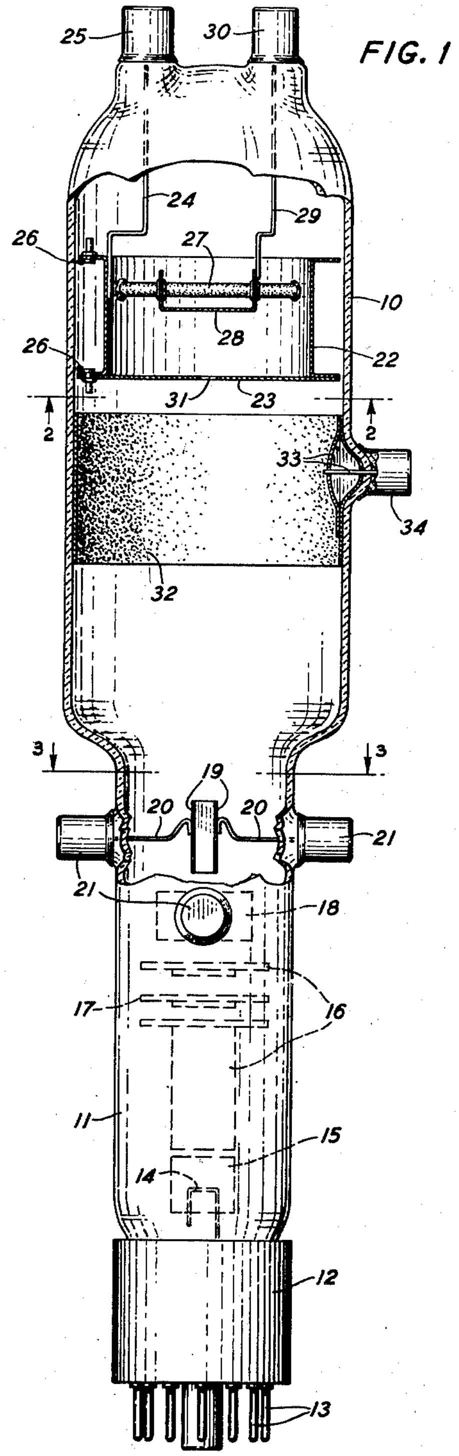

This invention relates to cathode-ray devices and more particularly to such devices especially suitable for use as decoders in pulse code modulation communication systems such as disclosed in British Patent 637,820.

In communication systems of the type disclosed in the patent above-identified, the speech or other complex signals to be translated are amplitude sampled repeatedly and at high frequency and each sample is resolved into a pulse code group representative of the instantaneous amplitude thereof. At a receiving station, the pulse code groups are translated into pulses each of amplitude proportional to the corresponding signal sample and the original signal is thus reproduced. The fidelity of reproduction is dependent, of course, upon the accuracy with which the pulse groups are resolved or decoded into amplitude modulated signals.

One object of this invention is to improve the resolution of pulse code groups into amplitude modulated signals thereby to attain high fidelity reproduction of the transmitted signals, in pulse code modulation communication systems.

In accordance with one feature of this invention, each pulse group is converted into electrical charges, one for each pulse in the group, all the charges being of fixed amplitude independent of the shape of the pulses, and the charge per unit of time corresponding to the duration of a pulse group is resolved into a signal of amplitude proportional to that of the signal sample represented by the pulse group.

More specifically, in accordance with one feature of this invention, the translation of pulse groups into amplitude signals is effected by a cathode-ray device including a target electrode, an electron gun for projecting an electron stream toward the target electrode, and a mask between the gun and target electrode having a single elongated aperture of prescribed constant width therein opposite the target electrode. The device comprises also two pairs of deflector plates, for example in space quadrature, one pair of plates being energized in accordance with the pulses in the groups to deflect the electron stream along the slot. The other pair of plates is energized to sweep the beam repeatedly in the direction across the slot. The deflector plates and slot are correlated so that in the absence of pulses the beam sweep is beyond one end of the slot.

For each pulse the beam is deflected in the direction of the length of the slot so that it passes across the slot once, thereby to place a charge upon the target electrode. The amplitude of the charge is independent of the pulse shape so that each pulse produces the same charge upon the target. Each group of pulses, therefore, produces upon the target a charge which is determined by the number of pulses in the group. Each charge due to a group of pulses then is resolved into a signal of amplitude determined by the number and time position of the pulses.

In accordance with another feature of this invention, a collector electrode is provided in cooperative relation with the mask for withdrawing secondary electrons which may emanate therefrom, thereby to prevent alteration of the charges placed upon the target electrode, by secondary emission effects.

Figure 4:
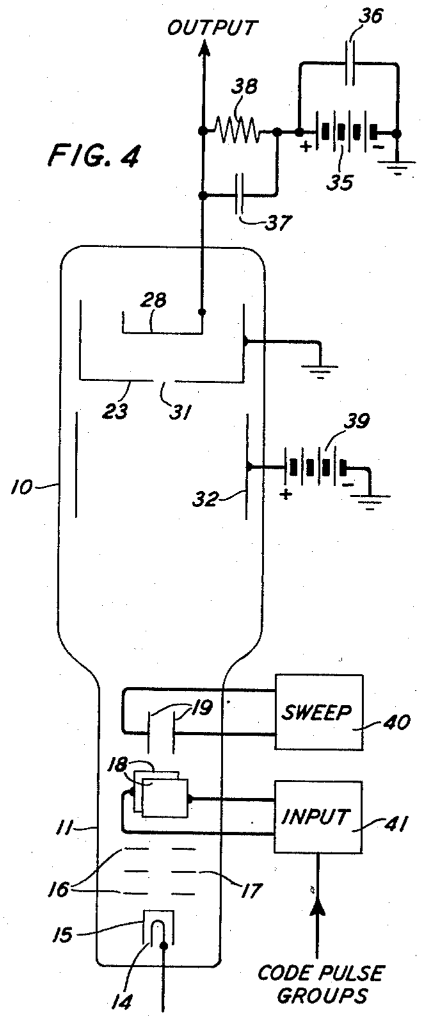
Figure 2:
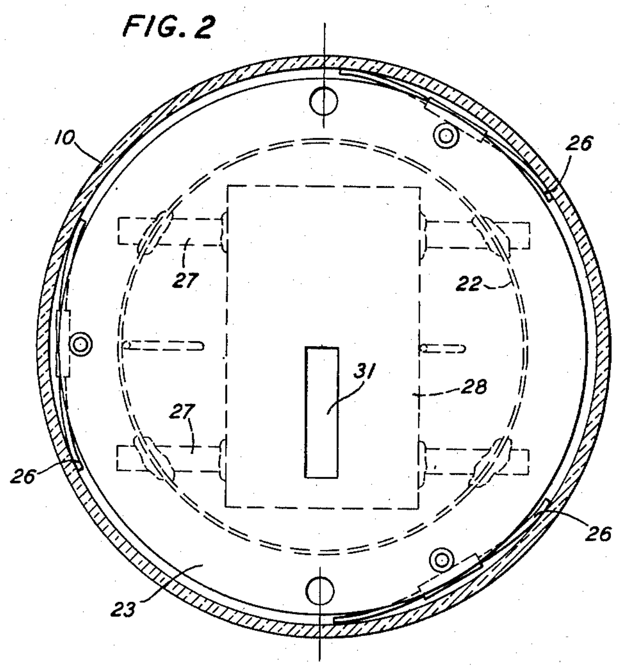
Figure 3:
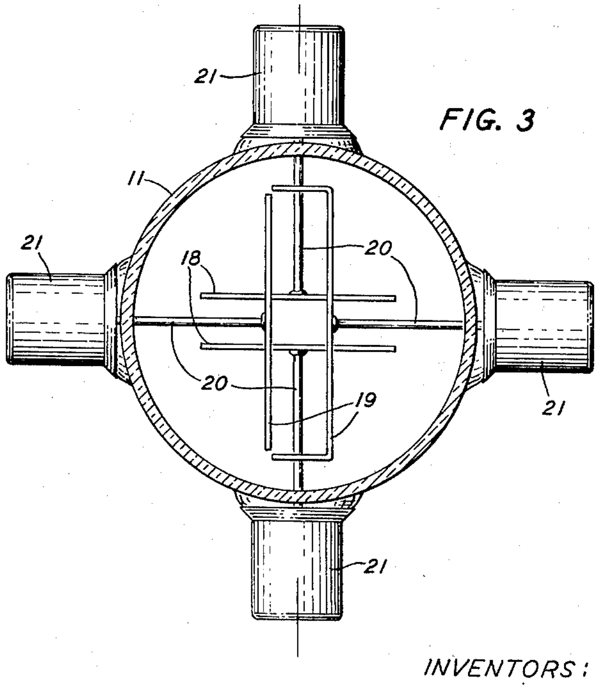

The invention and the above-noted and other features thereof will be understood more clearly and fully from the following detailed description with reference to the accompanying drawing in which:

Fig. 1 is a side view, partly in section and partly in outline form, of a cathode-ray device illustrative of one embodiment of this invention;

Figs. 2 and 3 are enlarged cross-sectional views of the device taken along planes 2—2 and 3—3 respectively in Fig. 1; and Fig. 4 is a circuit diagram illustrating one manner in which the device may be utilized as a receiver or decoder in pulse code modulation communication systems.

Referring now to the drawing, the electron discharge device therein illustrated comprises a highly evacuated, vitreous enclosing vessel having a body portion 10 and a neck portion 11 to which a base 12 carrying terminal prongs 13 is affixed. Mounted within the neck portion 11 is an electron gun, which may be of known construction, for producing a concentrated electron beam and projecting it axially of the enclosing vessel. The gun comprises a cathode 14, a beam intensity control electrode 15, a two-part accelerating anode 16 and a focussing electrode 17, all of which are connected to the terminals 13. In order to simplify the drawing, details of the mounting of the gun electrodes and of the connections between the electrodes and terminals have been omitted.

Opposite the electron gun are two pairs of deflector plates 18 and 19 mounted in space quadrature and with the plates of each pair equally spaced on opposite sides of the axis of the gun. The deflector plates are mounted by rigid leading-in conductors 20 sealed through the neck portion 11 and joined to terminal caps 21 secured to the portion 11.

An output electrode assembly is mounted within the body portion 10 of the enclosing vessel and comprises a cup-shaped mask or electrode having a cylindrical part 22 and a disc base part 23. The mask 22, 23 is supported by a leading-in conductor 24 sealed through the vessel and connected to a terminal cap 25 and by a plurality of springs 26 affixed thereto and having their end portions bearing against the body portion 10. Disposed within the mask and supported therefrom by insulating, e. g. ceramic rods 27, is a target electrode 28, for example of carbonized nickel, which is axially aligned with the electron gun. Electrical connection to the target electrode 28 may be established by way of a leading-in conductor 29 connected to a terminal cap 30.

The disc base 23 of the mask is provided with a rectangular aperture or slot 31 which, as shown in Fig. 2 is offset from the center of the base and, as illustrated in Figs. 2 and 3 the vertical axes of which are coincident, is aligned with the gap between the deflector plates 19. The shorter sides of the slot are parallel to the deflector plates 18. Advantageously, the face of the disc 23 toward the electron gun is treated or coated to reduce secondary electron emission therefrom.

The body portion 10 of the enclosing vessel has on a part of its inner wall near the mask a cylindrical coating 32 of electrically conductive material which serves as an electrode for collecting secondary electrons that may emanate from the mask. Electrical connection to the coating 32 may be established by way of a conductor 33 connected thereto and to a terminal cap 34 affixed to the vessel portion 10.

In the operation of the device, as illustrated in Fig. 4, the electrodes constituting the electron gun are energized to produce a concentrated electron beam, of diameter smaller than the lesser dimension of the slot 31, axially of the vessel 10, 11. The target electrode 28 is maintained at a potential positive with respect to the gun by a source such as a battery 35 having a by-pass condenser 36 connected thereacross. Connected to the target electrode in parallel relation are a condenser 37 and resistor 38 which, as disclosed, for example, in British Patent 637,843, are correlated so that charges placed upon the target electrode in a prescribed unit of time, i. e. the pulse group period, are resolved into pulses or signals of amplitude proportional to the charge remaining upon the electrode at the end of the pulse group period and, hence, proportional to the signal sample represented by the pulse group. The mask or electrode 23 may be connected to ground and the collector electrode 32 is maintained at a positive potential, higher than that of the target electrode, relative to the mask by a source such as a battery 39.

A continuous linear or sinusoidal sweep voltage of the period of the pulses in the code groups is impressed between the deflector plates 19 by a suitable source 40. The code pulse groups to be translated are impressed between the deflector plates 18 by way of an input circuit 41 which includes a bias source such that in the absence of a code pulse the electron beam is directed beyond one end of the slot 31, for example, the lower end thereof in Fig. 2.

Whenever a code pulse is impressed upon the input circuit 41, the electron beam is deflected in the direction of the length of the slot 31, e. g. upwardly in Fig. 2, and, thus, is swept across the slot, that is in the direction parallel to the shorter sides of the slot, once. While it crosses the slot, the beam impinges upon the target electrode 28 and places a charge thereon. It will be noted that the magnitude of this charge is independent of the pulse shape so that each pulse produces the same charge increment upon the target electrode. Each cumulative charge upon the electrode at the end of a pulse group period is resolved into an output pulse or signal of amplitude determined by the number and time position of code pulses producing the charge and, hence, to the amplitude of the signal sample represented by the code pulse group. Because of the independence of incremental charges from pulse shape, high fidelity translation of code pulse groups into amplitude modulated output signals is attained. The translation fidelity is enhanced by the fact that secondary electrons which may emanate from the mask 23 are collected by the electrode 32 and, thus, prevented from passing to the target electrode 28 and altering the charge thereon. In typical devices constructed in accordance with this invention, translation accurate to within one part in 1200 has been realized.

Although a specific embodiment of this invention has been shown and described, it will be understood that it is but illustrative and that various modifications may be made therein without departing from the scope and spirit of this invention as defined in the appended claims.

What is claimed is:

1. A decoder for pulse code modulation communication systems, comprising a mask member having a rectangular aperture therein, a target opposite one face of said member and opposite said aperture, means for projecting an electron beam against the opposite face of said member, sweep means for directing said beam recurrently along a path in proximity to and beyond one side of said aperture, means energized in accordance with code pulse groups for causing said beam to pass across said aperture once for each pulse, and means including said target for converting the beam current which passes through said aperture per unit of time into a signal of amplitude proportional to the signal represented by the pulse group corresponding to said unit of time.

2. A decoder for pulse code modulation communication systems, comprising a target electrode, means for projecting an electron beam toward said target electrode, a mask between said electrode and means and having therein an aperture opposite said electrode, said aperture being of constant dimension in one direction, a first deflection means for repeatedly sweeping said beam in said direction, a second deflection means for deflecting said beam at an angle to said direction, means for impressing energizing pulses upon said second deflection means in accordance with code pulse groups, whereby said beam crosses said aperture in said direction once for each code pulse, and means for resolving the charge induced on said target electrode by impingement of the beam thereon, per prescribed unit of time into a signal of amplitude determined by the number and time position of the pulses in said unit of time.

3. A decoder for pulse code modulation communication systems, comprising a mask member having an aperture of constant width therein, a target electrode opposite one face of said mask member and opposite said aperture, means opposite the other face of said member for projecting an electron beam toward it, sweep means for directing said beam recurrently along a path in proximity to and beyond one side of said aperture, means energized in accordance with code pulse groups for causing said beam to pass across said aperture once for each pulse, whereby said beam impinges upon said target electrode and places thereon for each pulse a charge of constant magnitude, and means for converting the charges on said electrode per time interval corresponding to a code group period into a signal of amplitude determined by the number and time position of pulses in such interval.

FRANK GRAY.
RAYMOND W. SEARS.

REFERENCES CITED

The following references are of record in the file of this patent:

UNITED STATES PATENTS

| Number | Name | Date |
|---|---|---|
| 2,144,337 | Koch | Jan. 17, 1939 |
| 2,165,308 | Skellett | July 11, 1939 |
| 2,173,193 | Zworykin | Sept. 19, 1939 |
| 2,202,376 | Hansell | May 28, 1940 |
| 2,202,511 | Andrew | May 28, 1940 |
| 2,262,407 | Rath | Nov. 11, 1941 |
| 2,324,851 | Koch | July 20, 1943 |
| 2,369,569 | Hulbert | Feb. 13, 1945 |
| 2,408,702 | Sziklai | Oct. 1, 1946 |
| 2,413,023 | Young, Jr. | Dec. 24, 1946 |
| 2,417,450 | Sears | Mar. 18, 1947 |
| 2,430,139 | Peterson | Nov. 4, 1947 |
| 2,438,928 | Labin | Apr. 6, 1948 |
| 2,462,860 | Grieg | Mar. 1, 1949 |

FOREIGN PATENTS

| Number | Country | Date |
|---|---|---|
| 102,587 | Australia | Dec. 2, 1937 |